No. 803,849. PATENTED NOV. 7, 1905.
H. C. PETERSON.
VEHICLE WHEEL BEARING.
APPLICATION FILED JUNE 28, 1905.

Witnesses:- Inventor,
F. C. Fliedner Henry C. Peterson
By Geo. H. Strong.
Atty

UNITED STATES PATENT OFFICE.

HENRY C. PETERSON, OF SAN FRANCISCO, CALIFORNIA.

VEHICLE-WHEEL BEARING.

No. 803,849.　　　　Specification of Letters Patent.　　　　Patented Nov. 7, 1905.

Application filed June 28, 1905. Serial No. 267,372.

*To all whom it may concern:*

Be it known that I, HENRY C. PETERSON, a citizen of the United States, residing in the city and county of San Francisco and State of California, have invented new and useful Improvements in Vehicle-Wheel Bearings, of which the following is a specification.

My invention relates to improvements in vehicle-wheel bearings; and it consists in a combination of parts and in details of construction, which will be more fully explained by reference to the accompanying drawings, in which—

Figure 1:
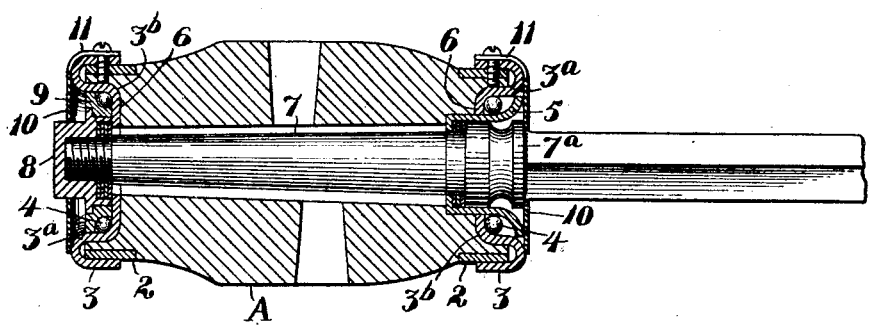
Figure 2:
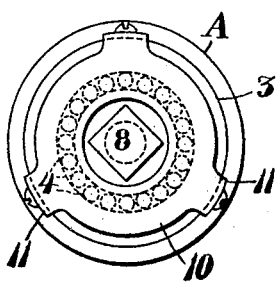

Figure 1 is a central sectional view of my wheel-bearing. Fig. 2 is an end view looking from the left of Fig. 1.

It is the object of my invention to provide an antifrictional bearing for wheels in which the parts of the bearing are attached to ends of the wheel-hub without any interior box, and they are specially useful for converting old wheels.

As shown in the drawings, A is a vehicle-wheel hub, of wood, having a central axial hole from end to end. Bands 2 of iron or steel are secured upon the ends of the hub to strengthen and prevent its splitting in the usual manner.

3 represents annular rings the outer parts of which are of sufficient interior diameter to fit snugly over the bands 2, and they may be secured to the bands by nuts or screws. The rings have inturned portions $3^a$, adapted to form annular channels which fit over the outer ends of the bands 2, to which they are secured. The ends of these annular portions have a convex finish, and the inner surfaces $3^b$ form cups within which balls 4 have their interior bearing, rolling between these ring-cups and the inner cone 5, carried by the axle-spindle. At the inner ends of the ring-cups are formed flat disks 6, which fit against the ends of the wooden hub and protect it from wear or abrasion. These disks are open at the center to receive the spindle of the axle. The inner end of this spindle carries the inner ball-cone 5, and this may be fitted upon any old spindle, being made hollow, so as to slip over and inclose the collar $7^a$, which is formed at the inner ends of all such spindles. The outer end of the spindle is screw-threaded to receive the nut 8, which retains the wheel in place, and on this nut is fixed the cone 9, between which and the ring-cup at that end of the hub the balls form to fit the bearing at this end of the hub. The spindle is thus held central in the interior of the hub without contact, and no box or sleeve for it is necessary.

This construction may be employed on new work and is especially suitable to convert old wheels to ball-bearing ones when the spindles on hub-boxes are worn out. The nut at the outer end of the spindle is chambered and contains shims or washers which abut against the shoulder at the end of the spindle, and one or more of these washers may be removed from time to time should adjustment be required. A thin disk 10 fits closely against the collar $7^a$ and has lugs 11, by which it is secured to the ring-cup to exclude dust from the bearing, and a similar disk incloses the opposite end bearing.

Having thus described my invention, what I claim, and desire to secure by Letters Patent, is—

1. A ball-bearing for vehicle-wheels, said bearing consisting of independent ring-cups fixed to the ends of the wheel-hub, an interior hollow cone inclosing the axle-spindle collar, another cone fixed to the nut which fits the outer end of the spindle and balls revoluble between the respective pairs of cups and cones.

2. In a ball-bearing for vehicle-wheels, collars having annular channels in their inner ends, and concave interior surfaces forming annular ball-bearing cups, and a wheel-hub having bands upon its ends said bands fitting and secured in the annular channels of the cups.

3. In a ball-bearing for vehicle-wheels, a hub having bands upon the ends, annularly-channeled rings fitting and secured to the bands said rings having their interior surfaces formed into cup-bearings for balls, and flat disks at the inner ends of the cups fitting against the hub ends and centrally bored to admit the axle-spindle.

4. In a vehicle-wheel bearing, a hub having bands fixed to the ends, annularly-channeled ring-cups fitting and secured to the bands, with disks fitting against the hub ends, a hollow cone fitting the axle-spindle collar and secured thereto, a nut screwed upon the end of the spindle and an inner ball-bearing cone fixed to the nut, adjustable therewith, and coincident with the ring-cup at the outer end of the hub.

5. In a ball-bearing for vehicle-wheels, collars having annular channels in their inner ends, and concave interior ball-bearing cups, bands upon the wheel-hub, to which said ball-cups are fixed, an axle-spindle extending through the hub, having a nut at its outer end and a collar on its inner end, ball-bearing cones fixed to the nut and to the collar respectively, and dust-including disks inclosing the collar and bearings said disks having lugs by which they are secured to the wheel-hub.

In testimony whereof I have hereunto set my hand in presence of two subscribing witnesses.

HENRY C. PETERSON.

Witnesses:
S. H. NOURSE,
HENRY P. TRICOU.